(12) United States Patent
Sugiura et al.

(10) Patent No.: US 6,445,668 B2
(45) Date of Patent: Sep. 3, 2002

(54) ASTIGMATISM GENERATING DEVICE TO REMOVE COMMA ABERRATION AND SPHERICAL ABERRATION

(75) Inventors: Satoshi Sugiura; Akihiro Tachibana; Yoshihisa Kubota, all of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/085,229

(22) Filed: May 27, 1998

(30) Foreign Application Priority Data

May 28, 1997 (JP) .............................................. 9-138779

(51) Int. Cl.[7] ................................................. G11B 7/00
(52) U.S. Cl. ................................ 369/112.12; 369/44.23; 369/112.15
(58) Field of Search ................................. 369/112, 103, 369/109, 44.14, 44.23, 44.29, 44.26, 53.22, 112.02, 112.19, 112.12, 112.21, 112.28, 44.13, 44.16, 112.15; 359/495, 497, 596, 501, 328; 372/22

(56) References Cited

U.S. PATENT DOCUMENTS

| | | | | |
|---|---|---|---|---|
| 4,358,200 A | | 11/1982 | Heemserk et al. | 356/123 |
| 4,609,813 A | * | 9/1986 | Cohen | 369/45 |
| 4,778,984 A | * | 10/1988 | Nakamura | 369/45 |
| 4,794,585 A | * | 12/1988 | Lee | 369/112 |
| 4,812,638 A | * | 3/1989 | Ogata et al. | 369/44 |
| 4,829,506 A | * | 5/1989 | Bressers et al. | 369/112.12 |
| 4,862,446 A | * | 8/1989 | Maeda | 369/112 |
| 5,515,354 A | * | 5/1996 | Miyake et al. | 369/112 |
| 5,708,638 A | * | 1/1998 | Braat et al. | 369/44.29 |
| 5,777,975 A | * | 7/1998 | Horinouchi et al. | 369/112 |
| 5,804,814 A | * | 9/1998 | Musha et al. | 369/44.23 |
| 5,867,315 A | * | 2/1999 | Koike et al. | 359/495 |

FOREIGN PATENT DOCUMENTS

JP  02-008379 B2  2/1990

* cited by examiner

Primary Examiner—William Korzuch
Assistant Examiner—Kim-Kwok Chu
(74) Attorney, Agent, or Firm—Morgan, Lewis & Bockius LLP

(57) ABSTRACT

An optical pickup device includes a photodetector divided into four light-receiving elements by two dividing lines, an incident optical system for irradiating a light beam onto an optical recording medium, and a receiving optical system for guiding a return light from the optical recording medium to the photodetector, wherein the receiving optical system includes astigmatism generating means for generating astigmatism having an astigmatism axis at an angle of 45 degree with respect to the two dividing lines.

17 Claims, 8 Drawing Sheets

ASTIGMATISM GENERATING DEVICE TO REMOVE COMMA ABERRATION AND SPHERICAL ABERRATION

This application claims the benefit of Japanese Application No. 9-138779, filed in Japan on May 28, 1997, which is hereby incorporated by reference.

BACKGROUND OF THE INVENTION

1. Field of the Invention

The present invention relates to an optical pickup device for an optical recording and reproducing apparatus, such as an optical disc player.

2. Discussion of the Related Art

An optical disc player, which can reproduce recording information from a recording media such as a laser disc (LD), a compact disc (CD) or a digital video (or versatile) disc (DVD), is well known. A so-called compatible disc player, which can reproduce recording information from those different types of optical discs, is also known.

In such a disc player, an optical pickup device has an optical system for irradiating a light beam onto an optical disc and reading a return light from the optical disc. Japanese patent publication JP-B-2-8379 discloses an example of the optical pickup device utilizing a diffraction grating formed on a transparent parallel flat plate for beam deflection and guiding. As shown in FIG. 11, the optical pickup device has a light beam from a light source 1 focused on a pit train formed on an information recording surface 5 of an optical disc by an objective lens 4. The return light reflected from the information recording surface 5 again passes through the objective lens 4, is deflected by a diffraction grating formed on a parallel flat plate 25, and is guided and focused onto four light-receiving elements of a photodetector 6.

In the optical pickup device described above, the four light-receiving elements of the photodetector 6 are divided and arranged parallel and perpendicular to the direction of the information track of the disc. Accordingly, when astigmatism is generated by the diffraction grating on the parallel flat plate 25, the direction of an astigmatism axis coincides with a direction of dividing lines of the four light-receiving elements, and a focus error signal cannot be detected. When the four light-receiving elements are inclined to a certain degree, a tracking error signal may interfere with the focus error signal. Namely, when the return light is detected for controlling the position of the light beam relative to an information track on the information recording surface, an overlap of the detecting surface and the track direction, or a land border, causes the interference of the detection signal.

SUMMARY OF THE INVENTION

Accordingly, the present invention is directed to an optical pickup device that substantially obviates one or more of the problems due to limitations and disadvantages of the related art.

An object of the present invention is to use a hologram optical element to improve the quality of the focus error signal.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, in one aspect of the present invention there is provided an optical pickup device including a photodetector divided into four light-receiving elements by two dividing lines, an incident optical system for irradiating a light beam onto an optical recording medium, and a receiving optical system for guiding a return light from the optical recording medium to the photodetector, wherein the receiving optical system includes astigmatism generating means for generating astigmatism having an astigmatism axis at an angle of 45 degree with respect to the two dividing lines.

In another aspect of the present invention there is provided an optical pickup device including a light source for irradiating an incident light beam onto an optical recording medium, a photodetector having four light-receiving elements for receiving a return light beam from the optical recording medium, and a light deflecting device positioned in a forward light path between the light source and the optical recording medium and in a return light path between the optical recording medium and the photodetector, wherein the light deflecting device passes the incident light beam and deflects the return light towards the photodetector.

It is to be understood that both the foregoing general description and the following detailed description are exemplary and explanatory and are intended to provide further explanation of the invention as claimed.

BRIEF DESCRIPTION OF THE ATTACHED DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings.

Figure 1:
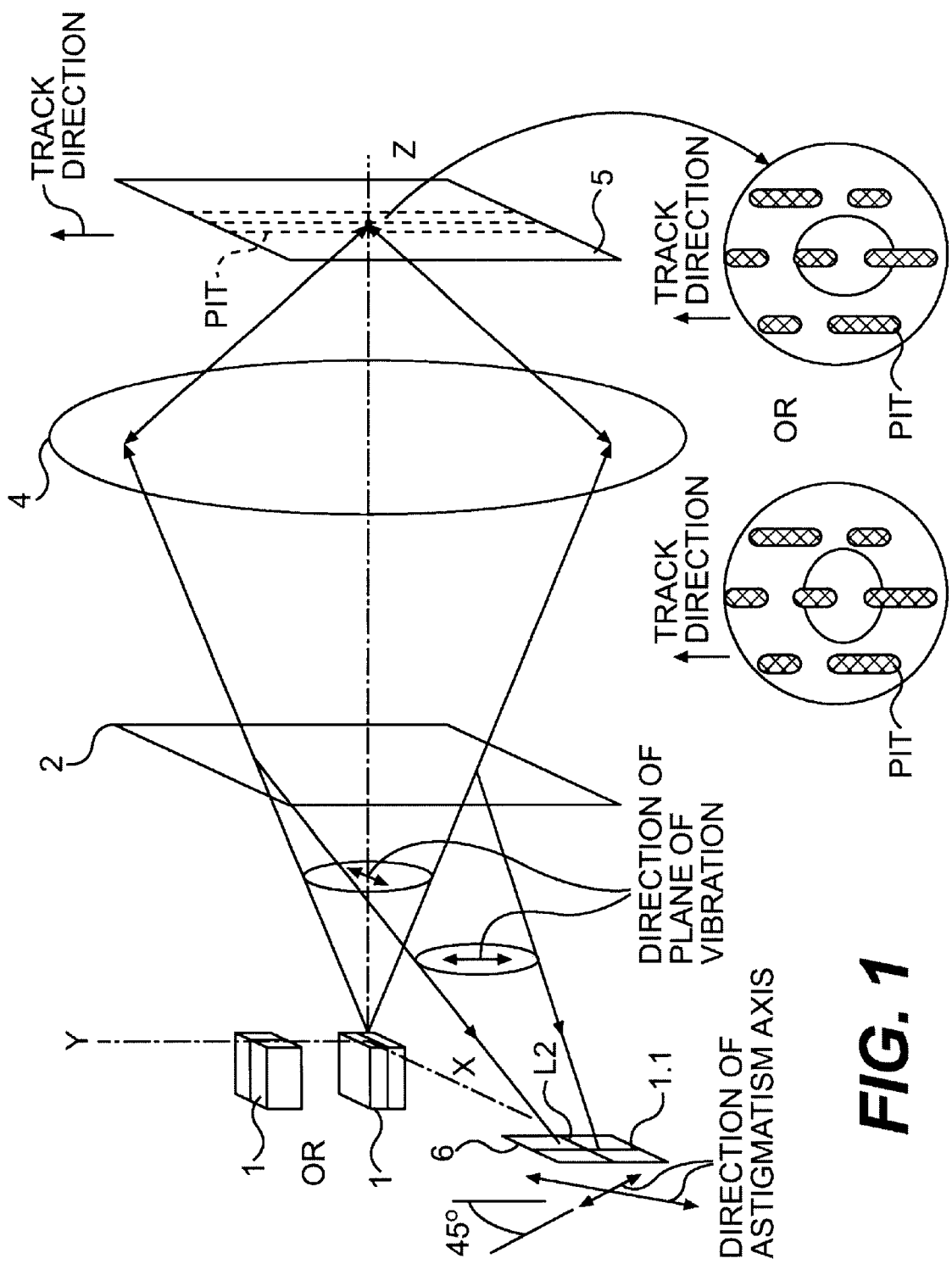
FIG. 1 is a schematic perspective view of an optical system of an optical pickup device using a hologram optical element according to a first embodiment of the present invention.

FIG. 1 is a schematic view of an optical pickup device in an optical recording and reproducing apparatus according to the present invention.

In an optical system of a forward light path in which a light beam is incident onto an optical disc, the light beam from a TE mode laser diode 1 (a light source) passes through a hologram optical element 2 (a deflecting device). The light beam is then focused onto a pit train formed on an information recording surface 5 of the optical disc by an objective lens 4. The pit train runs in a y direction (a track direction). The laser diode 1 emits the light beam (a Gaussian beam) having a plane of vibration in the direction parallel to a junction interface of the laser diode 1 and having an elliptic cross-sectional intensity distribution with a major longitudinal axis extending in a direction perpendicular to the junction interface of the laser diode 1. Depending on a position of the laser diode 1, an elliptical beam spot having the major longitudinal axis in the direction either parallel or perpendicular to a track direction is formed on the information recording surface 5. The laser diode 1 is mounted on a base plate along with four light-receiving elements of a photodetector 6.

In a receiving optical system of the return light path (which is the same as the optical system of the incident beam), the reflected light from the information recording surface 5 again passes through the objective lens 4 and the hologram optical element 2 and is deflected from the forward light path. The light deflected by the hologram optical element 2 is focused onto the four light-receiving elements of the photodetector 6.

Figure 2:
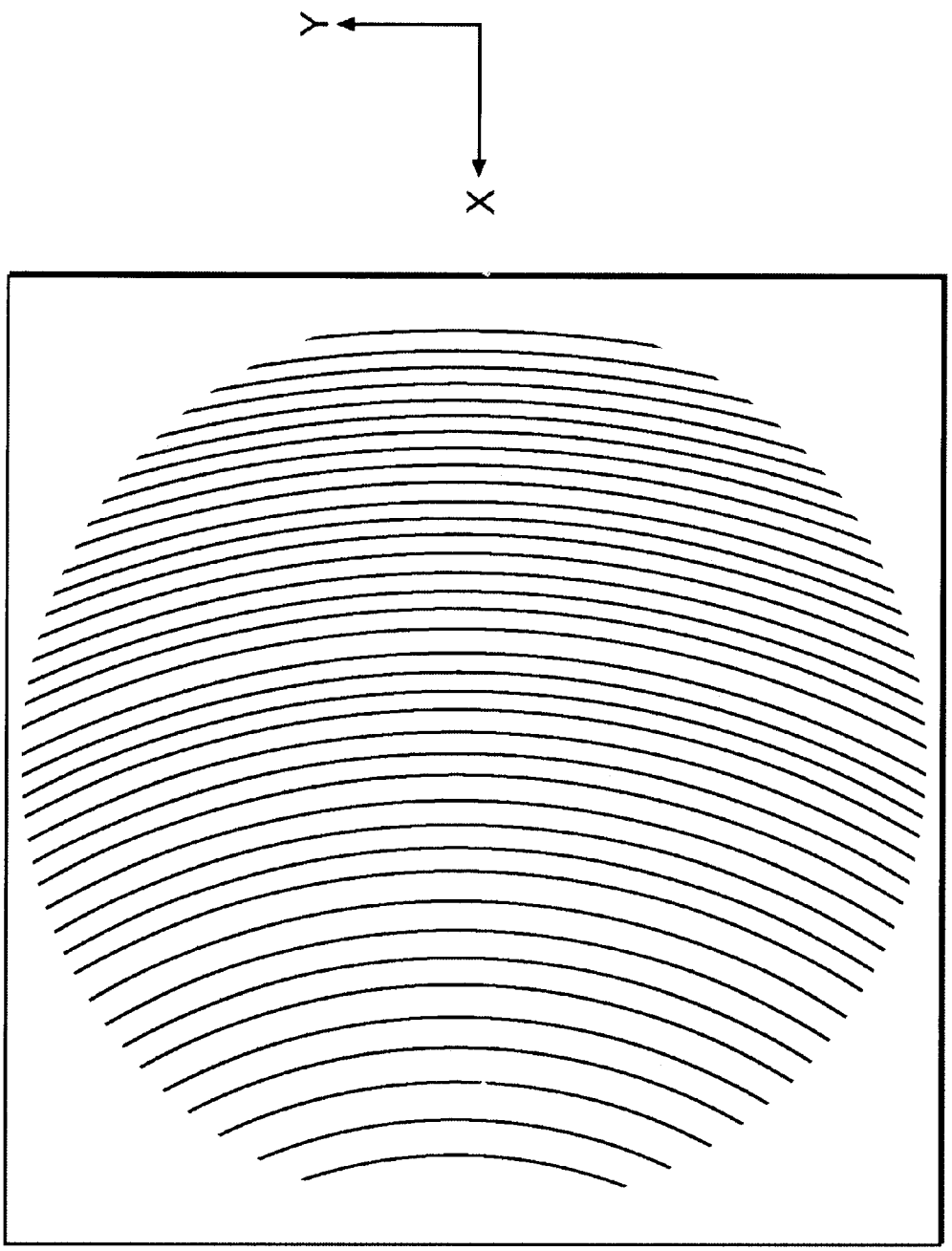
FIG. 2 is a plan view of a grating pattern of the hologram optical element in the optical pickup device according to the present invention.

In the first embodiment, the hologram optical element 2 that generates the astigmatism is employed as the deflecting device. FIG. 2 is a plan view of a grating pattern of the hologram optical element 2 as seen from the z direction. The hologram optical element 2 is a parallel flat plate of a transparent material having a diffraction relief formed on its main surface, generating the astigmatism.

The hologram optical element 2 is designed based on the interference of the light beam from the laser diode 1 and the reflected light at the four light-receiving elements. It may be designed by a computer method shown in FIG. 3 using any number of well-known techniques. The wavefront for the grating pattern is determined by a high refractive index method or a light following method using a phase function method.

Figure 3:
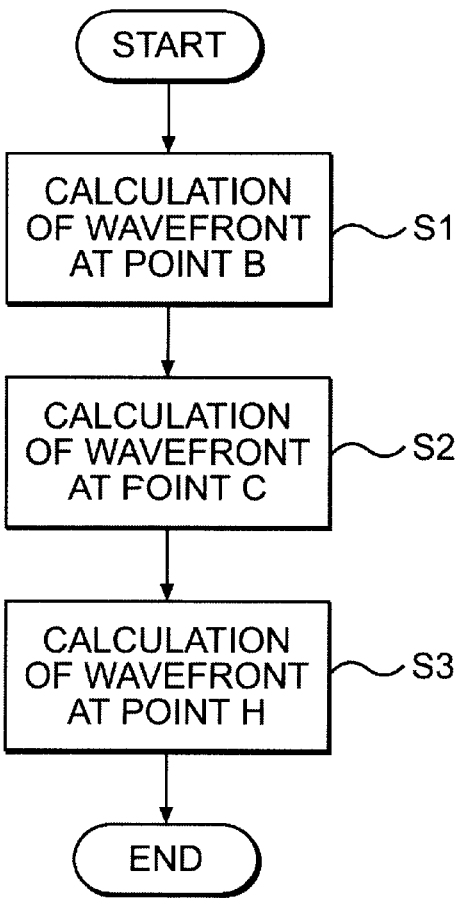
FIG. 3 is a flowchart explaining a wavefront design process of the hologram optical element in the optical pickup device according to the present invention.
Figure 4:
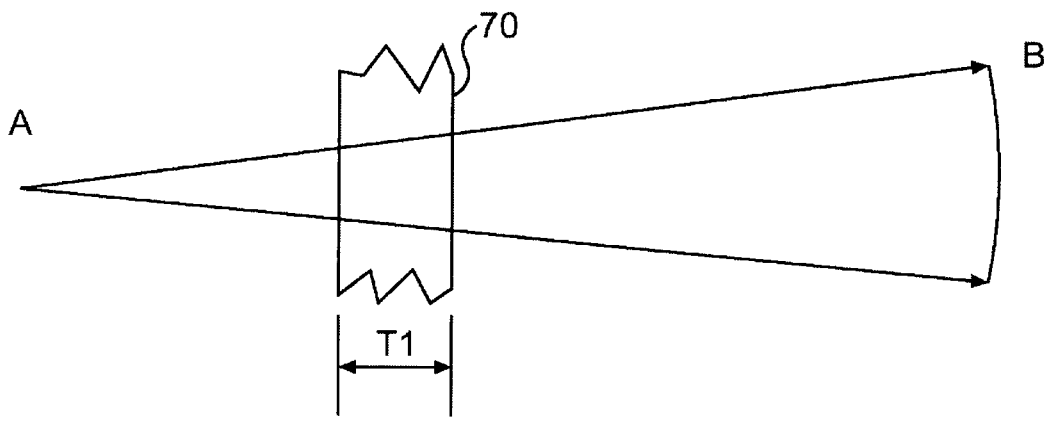
FIG. 4 is a schematic view explaining a wavefront design of the hologram optical element in the optical pickup device according to the present invention.

In step S1, of FIG. 3 and schematically shown in FIG. 4, a parallel flat plate 70 (refractive index n) having a thickness t1 is positioned in a light path of a light diverging from a point A (wavelength λ1), which corresponds to the laser diode. Initial values of parameters, i.e., the coordinates of the point A, λ1, t1 and n, are properly determined. With regard to the light after passing through the parallel flat plate 70, the wavefront at the coordinates of point B including spherical aberration is calculated. The result of the calculation is stored. The spherical aberration in the light caused by the parallel flat plate 70 is removed by a correction in step S2 of FIG. 3. The amount of the astigmatism generated by the parallel flat plate 70 is adjusted by changing the thickness t1.

Figure 5:
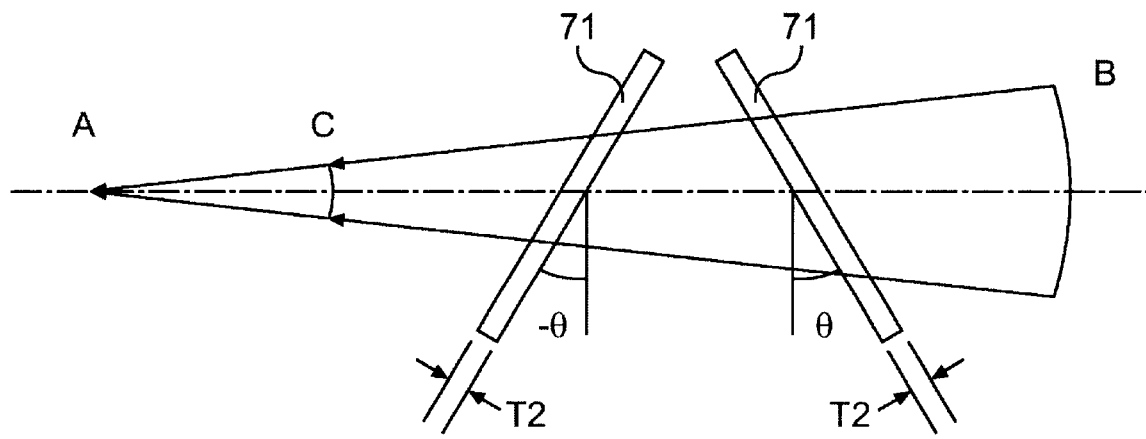
FIG. 5 is a schematic view explaining a wavefront design of the hologram optical element in the optical pickup device according to the present invention.

In step S2, as shown in FIG. 5, the stored wavefront at the point B is converged. The return light passes through the parallel flat plate 70 having the thickness of t1 (not shown) and is focused onto the point A. Two parallel flat plates 71 each having a thickness t2 and a refractive index n are positioned in the light path of the return light (instead of the parallel flat plate 70 of FIG. 4). The parallel flat plates 71 are positioned apart from each other and inclined at an angle of θ and −θ with respect to a plane perpendicular to a light axis in order to be a mirror image with respect to the plane. The wavefront at a point C after passing through the parallel flat plates 71 is calculated. Parameters such as the coordinates of the point C, t2, θ and −θ are properly selected.

As the light is converged from a point B, the wavefront passing through the two parallel flat plates 71 has astigmatism and spherical aberration, but no coma aberration. The spherical aberration can be adjusted by changing the thickness t2 of the parallel flat plates 71 and therefore the spherical aberration caused in step S1 can be removed. Thus, the wavefront at the point C after passing through the parallel flat plates 71 and having a certain amount of astigmatism, but no coma or spherical aberration, is calculated and stored.

Figure 6:
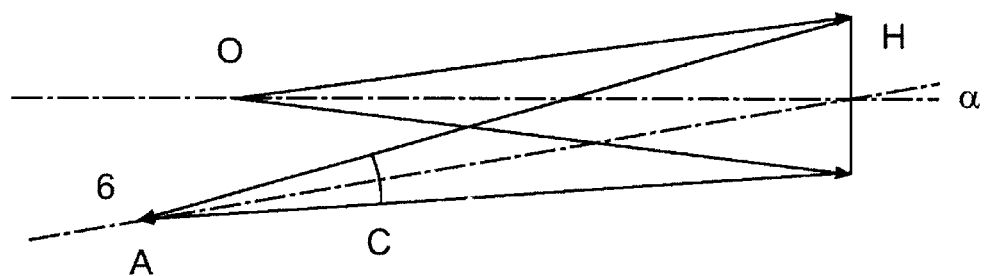
FIG. 6 is a schematic view explaining a wavefront design of the hologram optical element in the optical pickup device according to the present invention.

In step S3, as shown in FIG. 6, the stored wavefront at a point C is again diverged. The wavefront at a point H that is inclined at a certain angle (angle α) from the light axis is then calculated. Here, the point to which the light is converged from the stored wavefront at the point C corresponds to the position of the four light-receiving elements. At the point H (the position of the hologram optical element 2), the grating pattern of the hologram optical element 2 can be designed based on the interference of the calculated wavefront and the wavefront of the light diverging from a point O (the position of the laser diode 1). Parameters such as the coordinates of the point H and the point O and the angle α are properly selected. The obtained interference pattern at the point H is then stored and employed as the grating pattern of the hologram optical element 2.

By forming the grating pattern obtained as described above on a transparent substrate, the hologram optical element 2 shown in FIG. 2 generates astigmatism without causing coma or spherical aberration and functions as a lens for changing the focal length of the light beam.

Figure 7C:
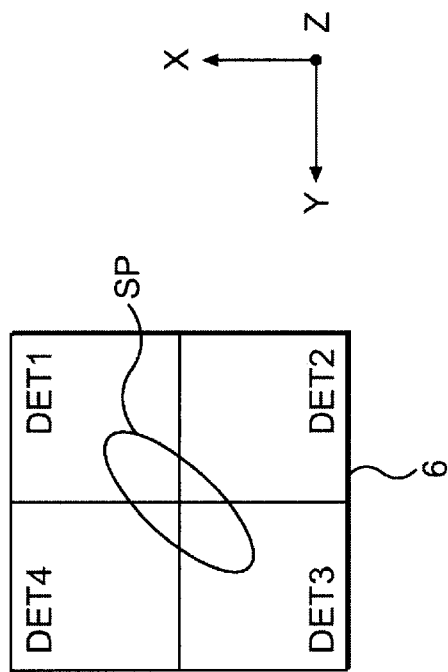
FIGS. 7A–7C are plan views of four light-receiving elements of a photodetector according to the present invention.
Figure 7B:
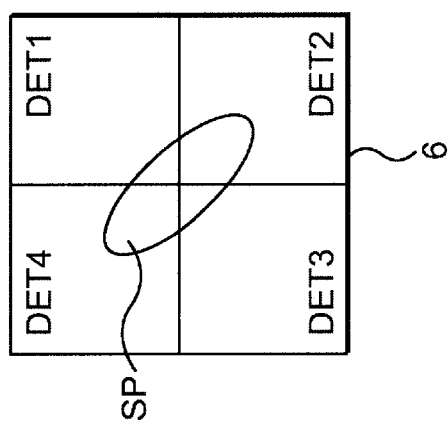
Figure 7A:
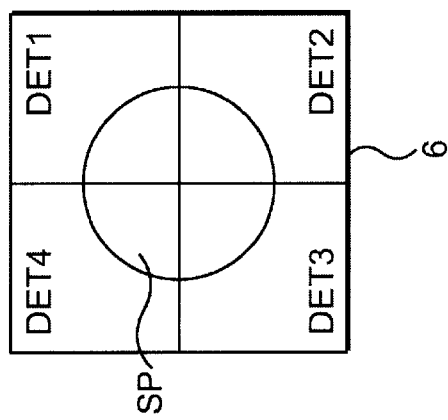

The hologram optical element 2 has a diffraction relief that is so designed that the diffracted light forms a light spot near the center of the four light-receiving elements of the photodetector 6. When the light beam is in focus on the information recording surface of the disc, a circular light spot is formed on the four light-receiving elements as shown in FIG. 7A. When the light beam is out of focus, an elliptic light spot is formed on the four light-receiving elements in the direction of diagonal line of the elements as shown in FIGS. 7B and 7C. Namely, the hologram optical element 2 generates astigmatism.

Figure 8:
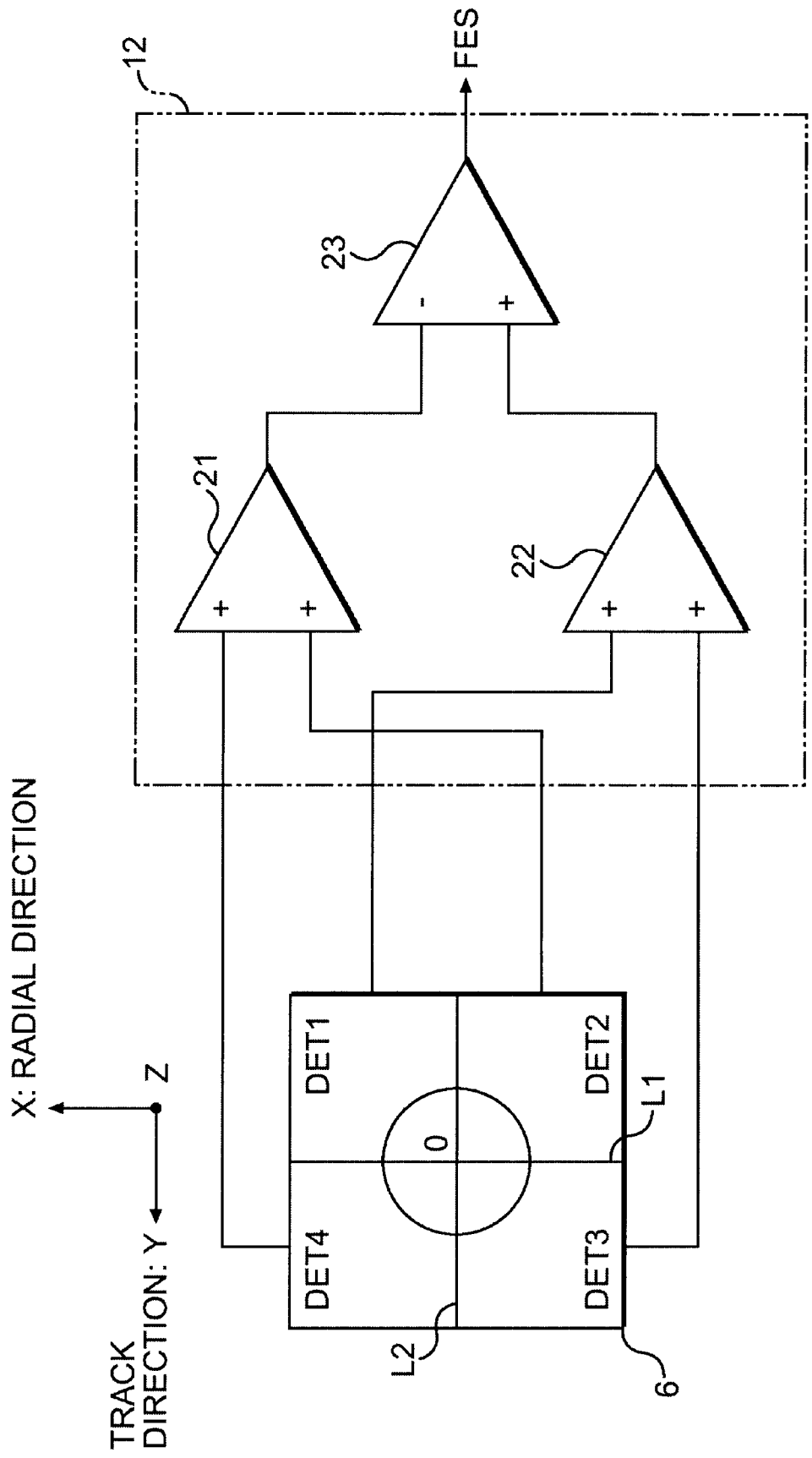
FIG. 8 is an electrical diagram of the photodetector according to the embodiment of the present invention.

The photodetector 6 has the four light-receiving elements divided by two lines L1 and L2 crossing each other at right angles. The light spot irradiated onto each of four light-receiving elements is converted into electric signals (through photoelectric conversion) and provided to a focus error detecting circuit 12, as shown in FIG. 8. The focus error detecting circuit 12 produces a focus error signal (FES) based on a signal from the photodetector 6 and provides the FES to an actuator drive circuit (not shown). The actuator drive circuit supplies a focusing drive signal to an actuator (not shown). The actuator moves the objective lens in the direction of the optical axis in accordance with the focusing drive signal.

As shown in FIG. 8, the focus error detecting circuit 12 is connected to the photodetector 6. The photodetector 6 is divided into four light-receiving elements DET1 to DET4 by the two dividing lines L1 and L2 crossing each other at right angles. The four elements DET1 to DET4 correspond to first through fourth quadrants that are mutually independent. The photodetector 6 is positioned so that one division line (L1 or L2) is parallel to the track direction and the other division line is parallel to the radial direction of the optical disc. The photoelectric conversion outputs from the elements DET1 and DET3, which are located symmetrically with respect to the center O of the light-receiving surface, are added by an adder 22. Similarly, the photoelectric conversion outputs from the elements DET2 and DET4 are added by an adder 21. The output signals from the adder 21 and 22 are fed into a differential amplifier 23. The differential amplifier 23 calculates a difference between the output signals and outputs the differential signal as the focus error signal FES.

As explained above, the focus error detection circuit 12 produces the focus error components by adding the output of the four light-receiving elements of the photodetector 6 using the adders 21 and 22 and calculating the differential signal of the outputs thereof using the differential amplifier 23. When the light beam is in focus, the intensity distribution is symmetrical with respect to the center O, i.e., symmetrical with respect to the track direction and the radial direction, and the circular light spot shown in FIG. 7A is formed on the photodetector 6. In this case, values obtained by adding the photoelectric conversion outputs of the elements existing on the diagonal lines are equal to each other and the focus error is 0. When the light beam is out of focus, the elliptic light spot having an axis in the diagonal direction is formed on the photodetector 6, as shown in FIGS. 7B and 7C. Accordingly, values obtained by adding the photoelectric conversion outputs of the diagonal pairs of the light-receiving elements are different from each other.

In the optical system described above, when the light beam traverses the pit train (track) due to an erroneous tracking operation, the amount of the return light at a portion corresponding to a shadow of the track fluctuates on the four light-receiving elements of the photodetector 6. In the astigmatism focusing method, the focus error signal is obtained from the difference between outputs of the diagonal light-receiving elements. Thus, if the shadow of the track is projected onto the diagonal pairs of light-receiving elements, the tracking error signal influences the focus error signal. Therefore, it is necessary for the extending direction of the shadow of the pit train (track) to coincide with the direction of the dividing line (L1 or L2) of the four light-receiving elements. For the above reason, the four light-receiving elements in FIG. 1 must have the dividing lines L1 and L2 coincide with the directions of the x axis and the y axis, respectively. This arrangement also coincides with the direction of the division when the tracking servo is controlled by phase difference (or time difference) methods. Accordingly, the directions of the dividing lines of the four light-receiving elements are determined depending on the direction of the pit train (track) on the information recording surface. Thus, when the light path of the incident light and that of the return light are separated using the deflecting device, and the astigmatism method is employed for the focus servo control, the direction of the astigmatism axis is restricted in accordance with the direction of the light-receiving elements.

In the astigmatism method using the four light-receiving elements, as shown in FIG. 1, the direction of the astigmatism generated for the focus servo control is limited to the direction at an angle of b 45degrees in the x-y plane shown in FIG. 1.

In the embodiment described above, the TE mode laser diode is used. However, a TM mode laser diode may similarly be used. With the TM mode laser diode, the light intensity distribution on the information recording surface extends in the radial direction even if the plane of vibration of the incident beam is in the y direction, and the direction of astigmatism is similarly limited to a direction of 45 degrees in the x-y plane.

A second embodiment of the present invention will now be explained. In the second embodiment, an optical pickup irradiates the light beam on the optical recording medium via a ¼ wavelength plate and an objective lens. The optical pickup employs a transparent flat polarization hologram optical element formed of a uniaxial crystal having a diffraction relief for generating astigmatism. With this, the structure of the compatible disc player for the DVD and DVD-RAM can be simplified, miniaturized, and its cost can be reduced.

Figure 9:
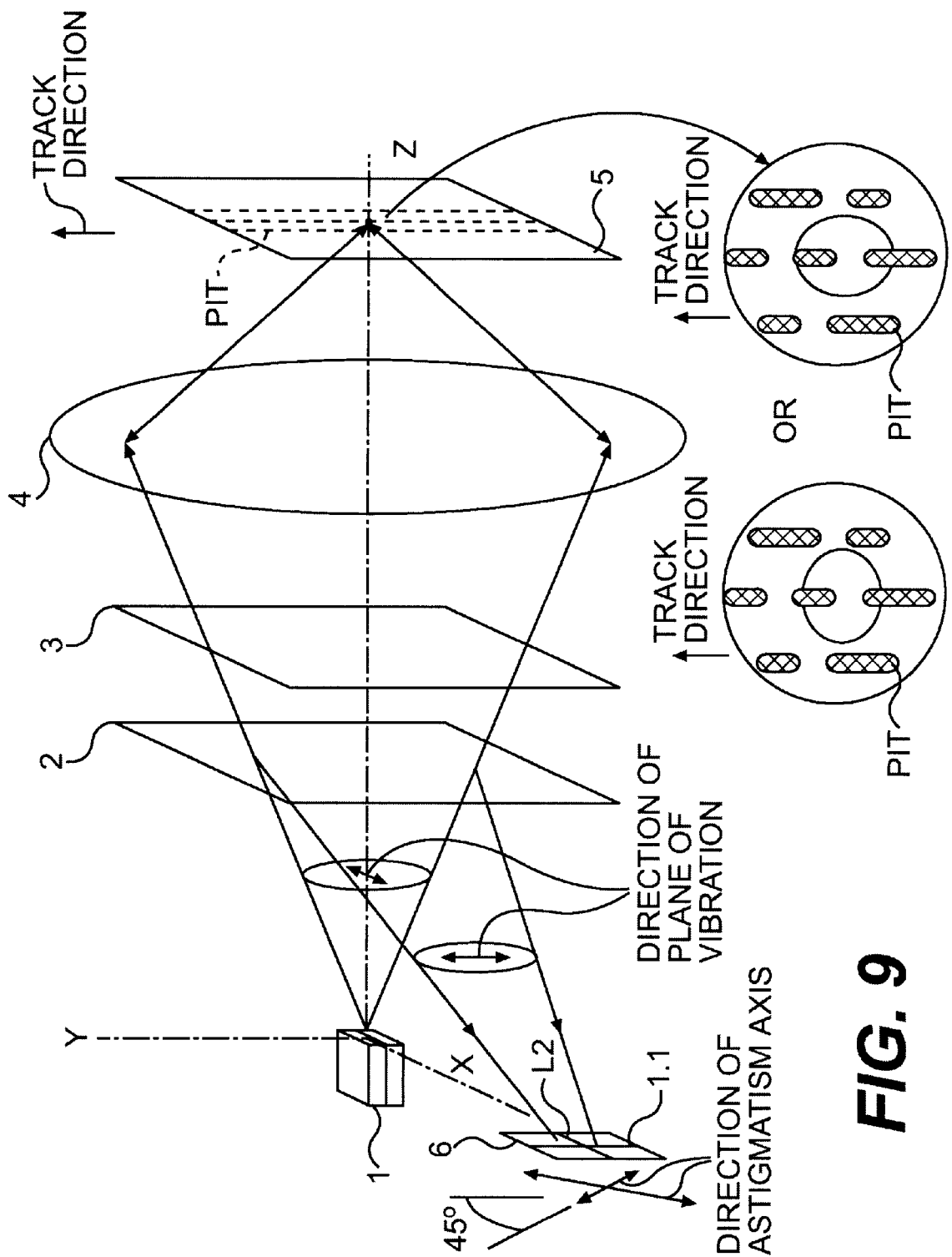
FIG. 9 is a schematic perspective view of an optical system of an optical pickup device using a hologram optical element according to a second embodiment of the present invention.
Figure 10:
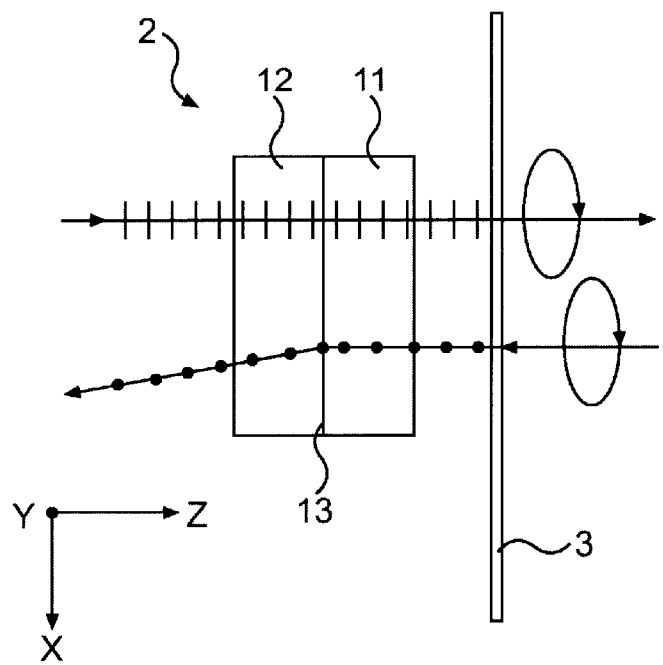
FIG. 10 is a view explaining the performance of a polarization hologram optical element in the optical pickup device of the present invention.
Figure 11:
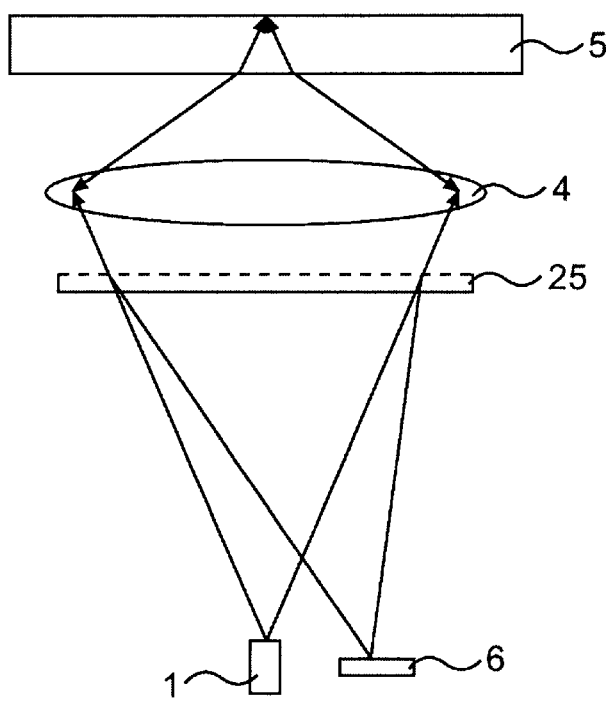
FIG. 11 is a schematic perspective view of an optical system of an optical pickup device using a conventional diffraction grating.

FIG. 9 is a schematic diagram of the optical pickup using the polarization hologram optical element in the optical recording and reproducing apparatus. In the light path of the incident beam, a light beam from a laser diode 1 is focused onto a pit train on an information recording surface 5 of an optical disc by an objective lens 4 via a polarization hologram optical element 2 (a deflecting device) and a ¼ wavelength plate 3. The incident light beam has a plane of vibration in the x direction, which is parallel to a junction interface and an emitting surface (cleavage plane) of the laser diode 1. Namely, the laser diode 1 is arranged so that the plane of vibration exists in the x direction. The incident light beam has an elliptic Gaussian distribution with a minor axis oriented in the x direction and a major longitudinal axis oriented in a y direction. As shown in FIGS. 9 and 10, the incident light beam passes through the polarization hologram optical element 2 and is converted from linear polarization into circular polarization by the ¼ wavelength plate 3. The light beam is then focused onto the information recording surface 5 by the objective lens 4.

In a receiving optical system of a return light path, the light beam having the circular polarization has been reflected and diffracted by the information recording surface 5 and again passes through the objective lens 4. The light beam of the circular polarization is then converted by the ¼ wavelength plate 3 into a linear polarization beam having a phase difference of 90 degrees with respect to the incident light beam. The plane of vibration is also rotated to the y direction. The light beam having the linear polarization is diffracted by the polarization hologram optical element 2 and is thus separated from the incident light path. As mentioned above, the reflected light from the information recording surface 5 is deflected by the polarization hologram optical element 2 via the objective lens 4 and the ¼ wavelength plate 3 by which the plane of vibration is inclined at an angle of 90 degrees from the incident light beam. The deflected light beam is then focused onto the four light-receiving elements of the photodetector 6. As shown in FIGS. 9 and 10, the incident light beam passes through the polarization hologram optical element 2, which produces astigmatism when the plane of vibration is oriented in the x direction. When the plane of vibration is oriented in the y direction, the incident light beam is diffracted by the polarization hologram optical element 2.

As shown in FIG. 10, the polarization hologram optical element 2 in the second embodiment includes a first transparent portion 11 formed of a transparent uniaxial crystal and a second transparent portion 12 having a refractive index substantially identical to an ordinary index $n_o$ or an extraordinary index $n_e$ of the uniaxial crystal. The first and the second transparent portions 11 and 12 are joined via a composition surface 13 having a diffraction relief formed thereon. The polarization hologram optical element 2 is a flat plate having parallel surfaces on both sides. The diffraction grating pattern for generating the astigmatism is formed on the composition surface 13 by the method described in the description of the first embodiment.

The angle of the optical crystal axis with respect to the optical axis of the incident light, and the ordinary index $n_o$ of the uniaxial crystal for the first transparent portion 11 are properly selected. The material of the second transparent portion 12 is also selected to have the same refractive index as the ordinary index $n_o$ of the uniaxial crystal. Thus, the polarization hologram optical element 2 performs different functions depending on the polarization of the incident light beam.

As shown in FIG. 10, for example, the first transparent portion 11 of the polarization hologram optical element 2 is formed of a negative (i.e., $n_o > n_e$) uniaxial optical crystal. The second transparent portion 12 is formed of the same material as the first transparent portion 11, having the crystal axis in the direction of the optical axis and joined to the first transparent portion 11 via the composition surface 13. When the optical axis of the first transparent portion 11 is not parallel to the optical axis of the incident light, but is perpendicular to the plane of the paper, for example, the light beam having the plane of vibration parallel to the plane of the paper is an ordinary ray. The refractive index of the first transparent portion 11 is $n_o$. Since the refractive index of the second transparent portion 12 is also $n_o$, the polarization hologram optical element 2 functions as a transparent parallel flat plate having the refractive index $n_o$ as a whole.

The return light has its plane of vibration perpendicular to the plane of the paper because the light passes through the ¼ wavelength plate twice. In the second transparent portion 12, the return light is the ordinary ray, and therefore the refractive index is $n_o$, same as the incident light. In the first transparent portion 11, however, the light behaves as the extraordinary ray, and the refractive index is $n_e$. Accordingly, for the return light, the polarization hologram optical element 2 functions as a diffraction grating in which the diffraction relief is formed as a borderline.

When the light beam (the arrow pointing right) having the plane of vibration parallel to the plane of the paper is incident on the optical disc via the polarization hologram optical element 2 (the parallel flat plate), the return light (the arrow pointing left) reflected from the optical disc passes through the polarization hologram optical element 2 and is detected by the photodetector 6. In the polarization hologram optical element 2, the first and second transparent portions 11 and 12 are joined so that their optical crystal axes cross at right angles. Thus, the difference in the refractive index between the first and second transparent portions 11 and 12 can be maximized. Furthermore, the deflecting angle of the return light can be adjusted by changing the angle of the composition surface 13 with respect to the optical axis, which is perpendicular to the optical axis in the second embodiment.

In the second embodiment, the refractive index of the second transparent portion 12 is substantially identical to the ordinary index $n_o$ of the first transparent portion 11. However, even if the refractive index of the second transparent portion 12 is substantially identical to the extraordinary index $n_e$ of the first transparent portion 11, the polarization hologram optical element 2 functions as a parallel flat plate and a hologram for the incident light and the return light, respectively.

In the second embodiment, the first and the second transparent portions 11 and 12 may be formed of different uniaxial crystal materials selected from among a variety of materials. Furthermore, in addition to the negative uniaxial crystal, a positive uniaxial material may also be used.

Both of the first and the second transparent portions 11 and 12 are not necessarily formed of anisotropic materials. Namely, it is also permissible to form the first transparent portion 11 of a uniaxial crystal and the second transparent portion of an isotropic material, and vice versa.

The second transparent portion 12 may be formed of an isotropic material such as the optical glass having a refractive index $n_g$ equal to the ordinary index $n_o$ of the first transparent portion 11 of the negative uniaxial crystal. The polarization hologram optical element 2 with such a structure functions as a transparent parallel flat plate having the refractive index $n_o$ (because $n_o = n_g$) for the incident light beam. For the return light, on the other hand, the polarization hologram optical element 2 functions as a diffraction grating because $n_e \neq n_g$.

The polarization hologram optical element 2 may be formed as a single flat plate of a transparent uniaxial crystal without combining two portions. The polarization hologram optical element may also be formed as a single flat plate having a diffraction relief for generating astigmatism on at least one main surface and having a uniaxial crystal filled in a concave portion of the diffraction relief.

In the embodiments described above, the return light is separated from the incident light path by the hologram optical element 2. However, other deflecting devices, such as a polarization beam splitter, may also be used instead of the hologram optical element 2. With such a structure, the return light from the optical disc is reflected by the polarization beam splitter at a right angle in the x direction and advances toward the photodetector 6 that is positioned so that the four light-receiving elements are located in the y-z plane in FIG. 1. The direction of the dividing lines of the light-receiving elements and the direction of the astigmatism axis are at an angle of 45 degrees with respect to the y axis or the z axis. Between the polarization beam splitter and the photodetector 6, an astigmatism generating device such as a convex cylindrical lens is inserted for generating astigmatism having an axis at an angle of 45 degrees.

In the embodiments described above, the optical pickup of a finite conjugate type system is described. However, the optical pickup of an infinite conjugate type system may also be used in which the objective lens, the hologram optical element 2, and the ¼ wavelength plate can be controlled as an integral member and a collimating lens is inserted in front of the light source.

According to the present invention, because a deflecting device that generates astigmatism is employed, the efficiency of the light being utilized is improved and the number of optical parts can be reduced. The efficiency of the light being utilized can be further improved by using a polarization element as the deflecting device.

It will be apparent to those skilled in the art that various modifications and variations can be made in the optical pickup device of the present invention without departing from the spirit or scope of the invention. Thus, it is intended that the present invention cover the modifications and variations of this invention provided they come within the scope of the appended claims and their equivalents.

What is claimed is:

1. An optical pickup device comprising:
   a photodetector divided into four light-receiving elements by two substantially perpendicular dividing lines;
   an incident optical system for irradiating a light beam onto an optical recording medium, the incident optical system including a light source for irradiating an incident light beam and an object lens for concentrating the incident light beam onto the optical recording medium and a hologram optical element, the light source, the object lens and the hologram optical element arranged on a first optical straight axis; and
   a receiving optical system for guiding a return light from the optical recording medium to the photodetector, the receiving optical system including the hologram optical element for deflecting the return light toward the photodetector and for generating astigmatism having an astigmatism axis fixed at an angle of 45 degrees with respect to the two dividing lines, the hologram optical element and the photodetector arranged on a second optical straight axis defining a different direction than the first optical straight axis.

2. The optical pickup device according to claim 1, wherein the hologram optical element is formed of a transparent plate having a diffraction relief formed thereon.

3. The optical pickup device according to claim 1, wherein the hologram optical element removes coma aberration and spherical aberration from the return light and generates the astigmatism.

4. The optical pickup device according to claim 1, wherein the hologram optical element focuses the return light onto the four light-receiving elements of the photodetector.

5. The optical pickup device according to claim 1, further in including a ¼ wavelength plate arranged on the first optical axis, wherein the hologram optical element is a polarization hologram optical element including a flat plate formed of a transparent uniaxial crystal.

6. The optical pickup device according to claim 5, wherein the polarization hologram optical element includes a flat plate formed of an isotropic material having a refractive index equal to one of an ordinary index and an extraordinary index of the transparent uniaxial crystal, the flat plate of the polarization hologram optical element being joined to the flat plate of the uniaxial crystal.

7. The optical pickup device according to claim 1, further including a ¼ wavelength plate arranged on the first optical axis, wherein the hologram optical element is a polarization hologram optical element of a transparent flat plate having a diffraction relief formed thereon for generating astigmatism and having a uniaxial crystal in concave portions of the diffraction relief.

8. An optical pickup device, comprising:
a light source for irradiating an incident light beam;
an object lens for concentrating the incident light beam onto an optical recording medium;
a photodetector having four light-receiving elements for receiving a return light beam from the optical recording medium, the four light-receiving elements defining two substantially perpendicular dividing lines; and
a hologram optical element positioned in a forward light path between the light source and the object lens and in a light path between the object lens and the photodetector, the hologram optical element passing the incident light beam and deflecting the return light beam toward the photodetector and generating astigmatism having an astigmatism axis fixed at an angle of 45 degrees with respect to the two dividing lines onto the return light beam,
wherein the optical pickup device defines two optical axes at different directions with respect to each other, one axis defined through the light source, the hologram, and the object lens but the photodetector, and the other axis defined through the hologram and the photodetector.

9. The optical pickup device according to claim 8, wherein the hologram optical element includes a diffraction relief formed thereon.

10. The optical pickup device according to claim 9, wherein the hologram optical element further includes a transparent plate on which the diffraction relief is formed.

11. The optical pickup device according to claim 8, further including a ¼ wavelength plate arranged on the first optical axis, wherein the hologram optical element is a polarization hologram optical element.

12. The optical pickup device according to claim, 11, wherein the polarization hologram optical element has a first transparent flat portion formed of a uniaxial crystal.

13. The optical pickup device according to claim 12, wherein the polarization hologram optical element has a second transparent flat portion formed of the same uniaxial crystal as the transparent flat portion.

14. The optical pickup device according to claim 13, wherein the first transparent flat portion and the second transparent portion are joined by a composition surface having a diffraction pattern.

15. The optical pickup device according to claim 12, wherein the polarization hologram optical element has a second transparent flat portion formed of an isotropic material having a refractive index equal to one of an ordinary index and an extraordinary index of the uniaxial crystal.

16. The optical pickup device according to claim 15, wherein the first transparent flat portion and the second transparent portion are joined by a composition surface having a diffraction pattern.

17. An optical pickup device, comprising:
a light source for irradiating an incident light beam;
an object lens for concentrating the incident light beam onto an optical recording medium;
a photodetector having four light-receiving elements for receiving a return light beam from the optical recording medium, the four light-receiving elements defining two substantially perpendicular dividing lines; and
a hologram optical element positioned in a forward light path between the light source and the object lens and in a light path between the object lens and the photodetector, the hologram optical element passing the incident light beam and deflecting the return light beam toward the photodetector and generating astigmatism having an astigmatism axis fixed at an angle of 45 degrees with respect to the two dividing lines onto the return light beam, the hologram optical element reducing spherical aberrations and coma aberrations, the hologram optical element being formed as one optical piece,
wherein the optical pickup device defines two optical axes at different directions with respect to each other, one axis defined through the light source, the hologram and the object lens but the photodetector, and the other axis defined through the hologram and the photodetector.

* * * * *